Nov. 15, 1938.  G. M. FAIR ET AL  2,136,844
ODOR OBSERVER AND ODOR METER
Filed March 19, 1935  7 Sheets-Sheet 1
Fig. 1.
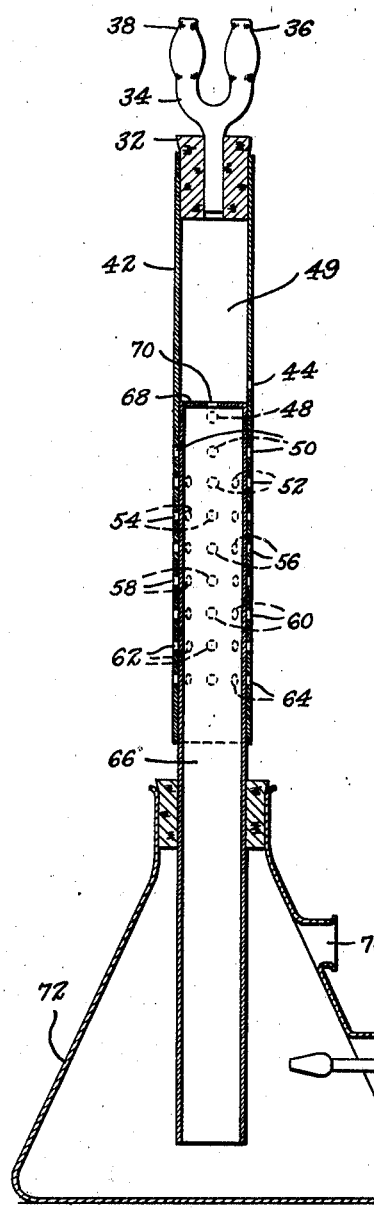
Fig. 2.
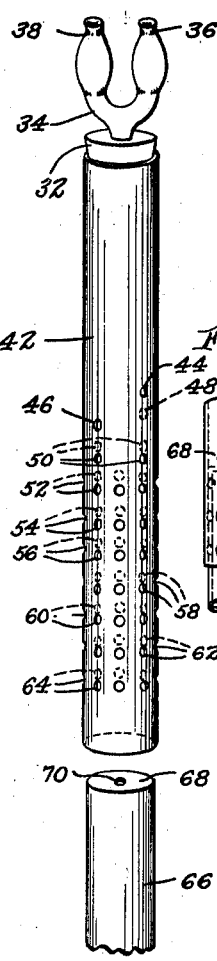
Fig. 3.
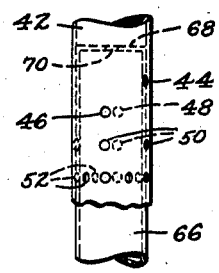
Fig. 4. Fig. 5. Fig. 6.
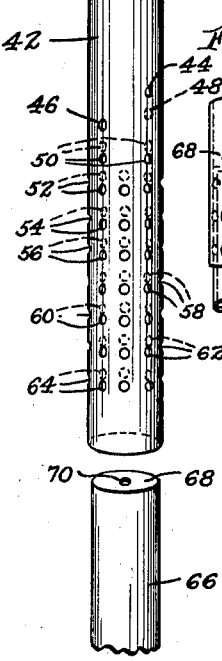
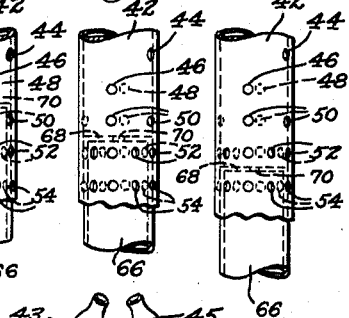
Fig. 7.
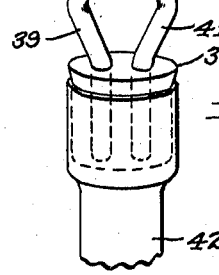
Inventors
Gordon M. Fair
William Firth Wells
by David Rines
Attorney

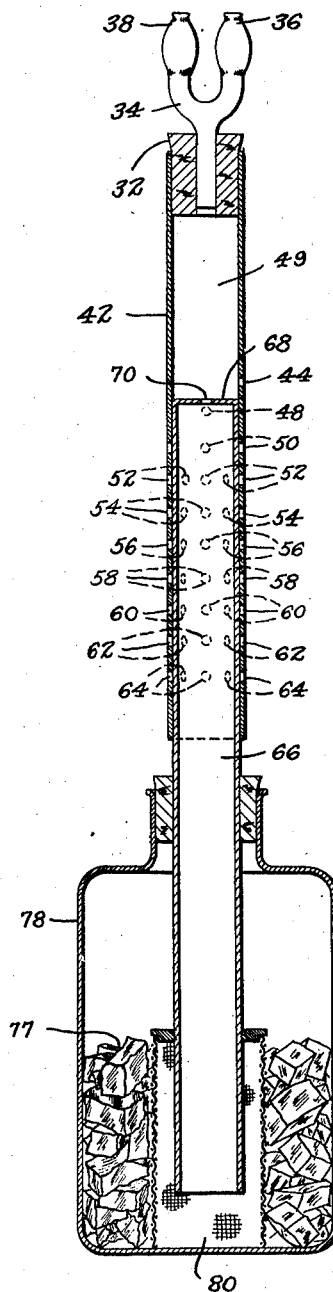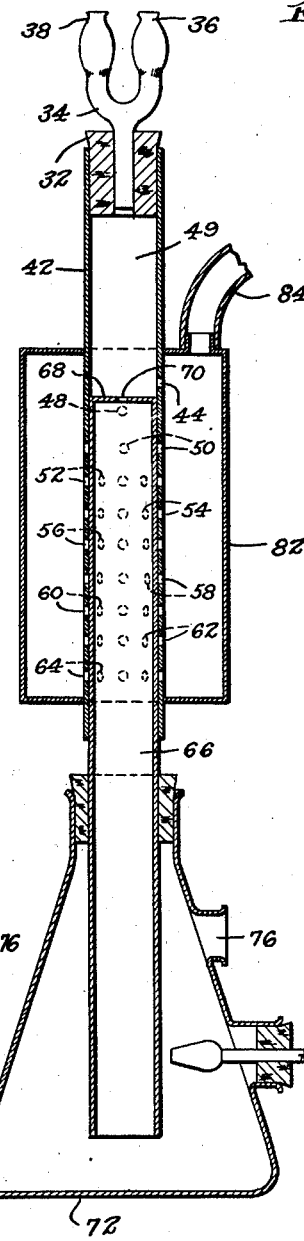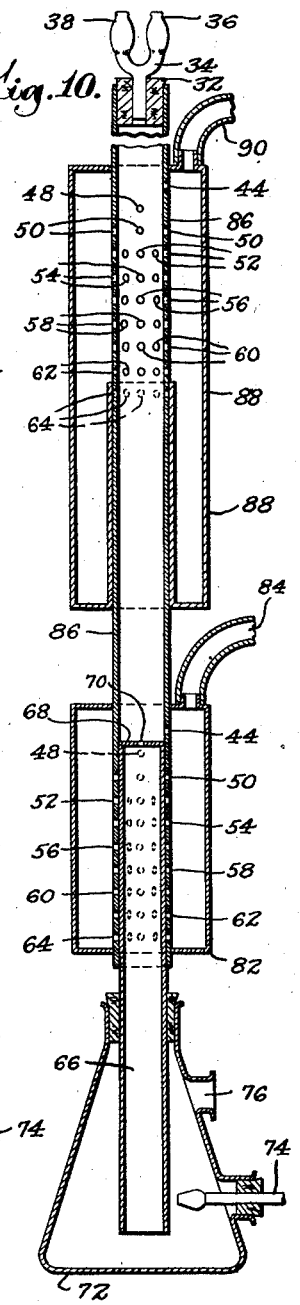

Nov. 15, 1938.　　　G. M. FAIR ET AL　　　2,136,844
ODOR OBSERVER AND ODOR METER
Filed March 19, 1935　　　7 Sheets-Sheet 3
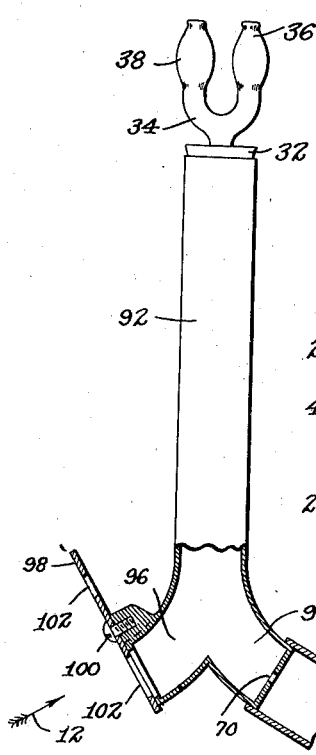
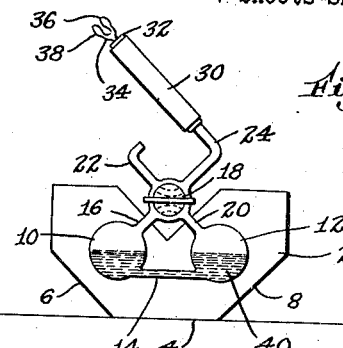
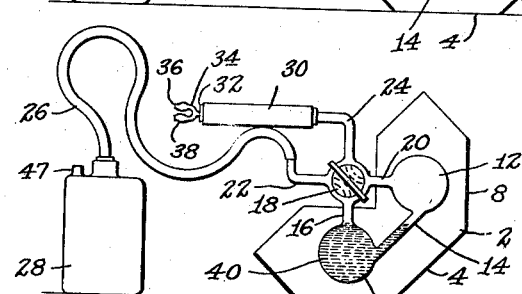
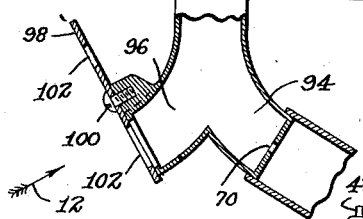
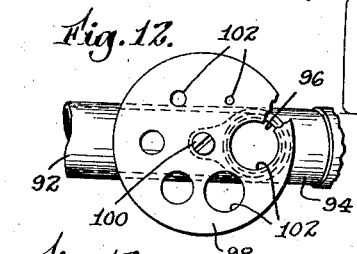
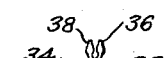
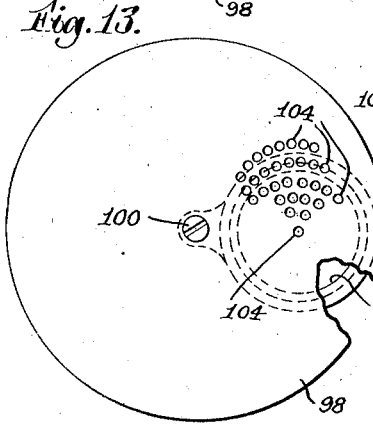
Inventors
Gordon M. Fair
William Firth Wells
by David Rines
Attorney

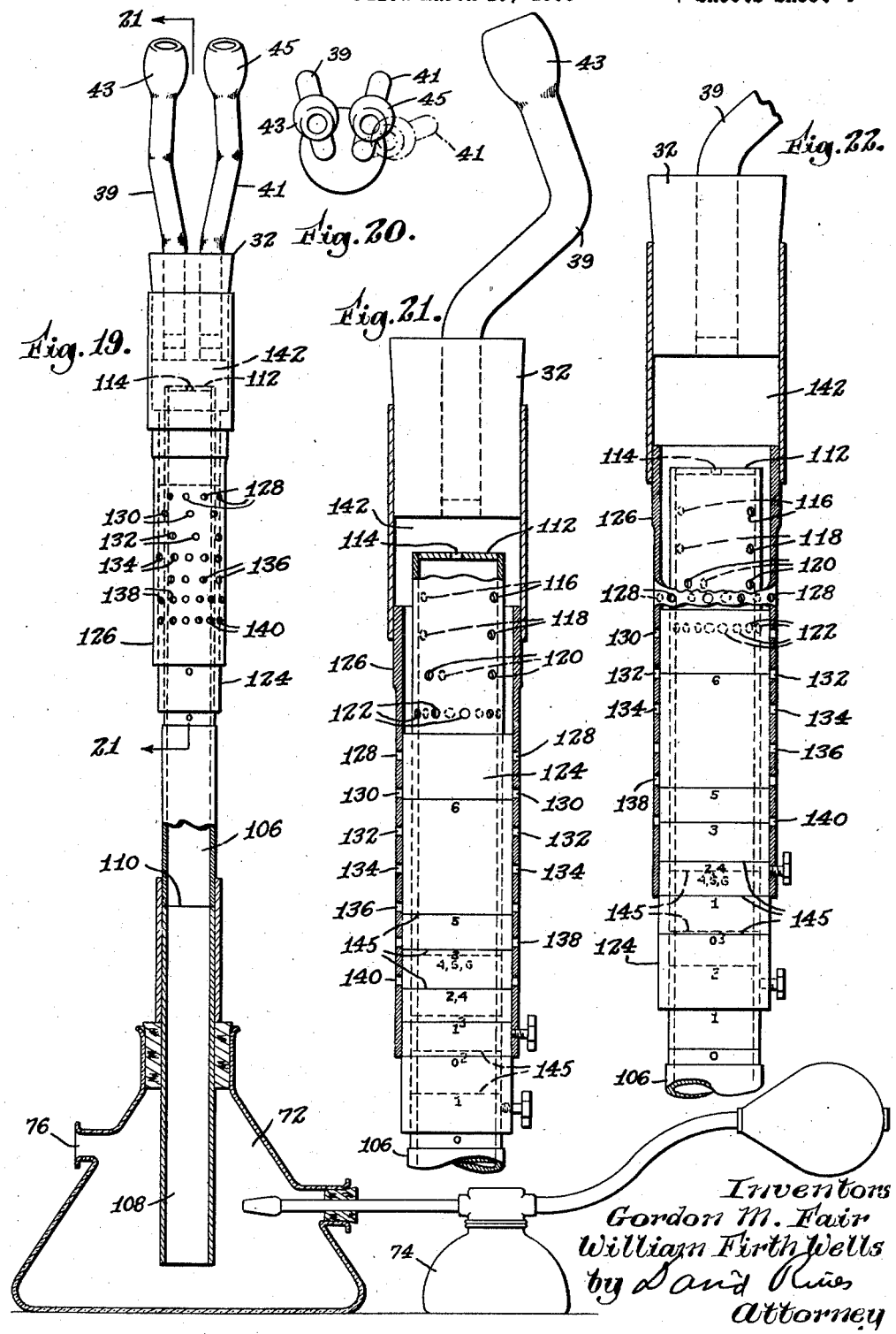

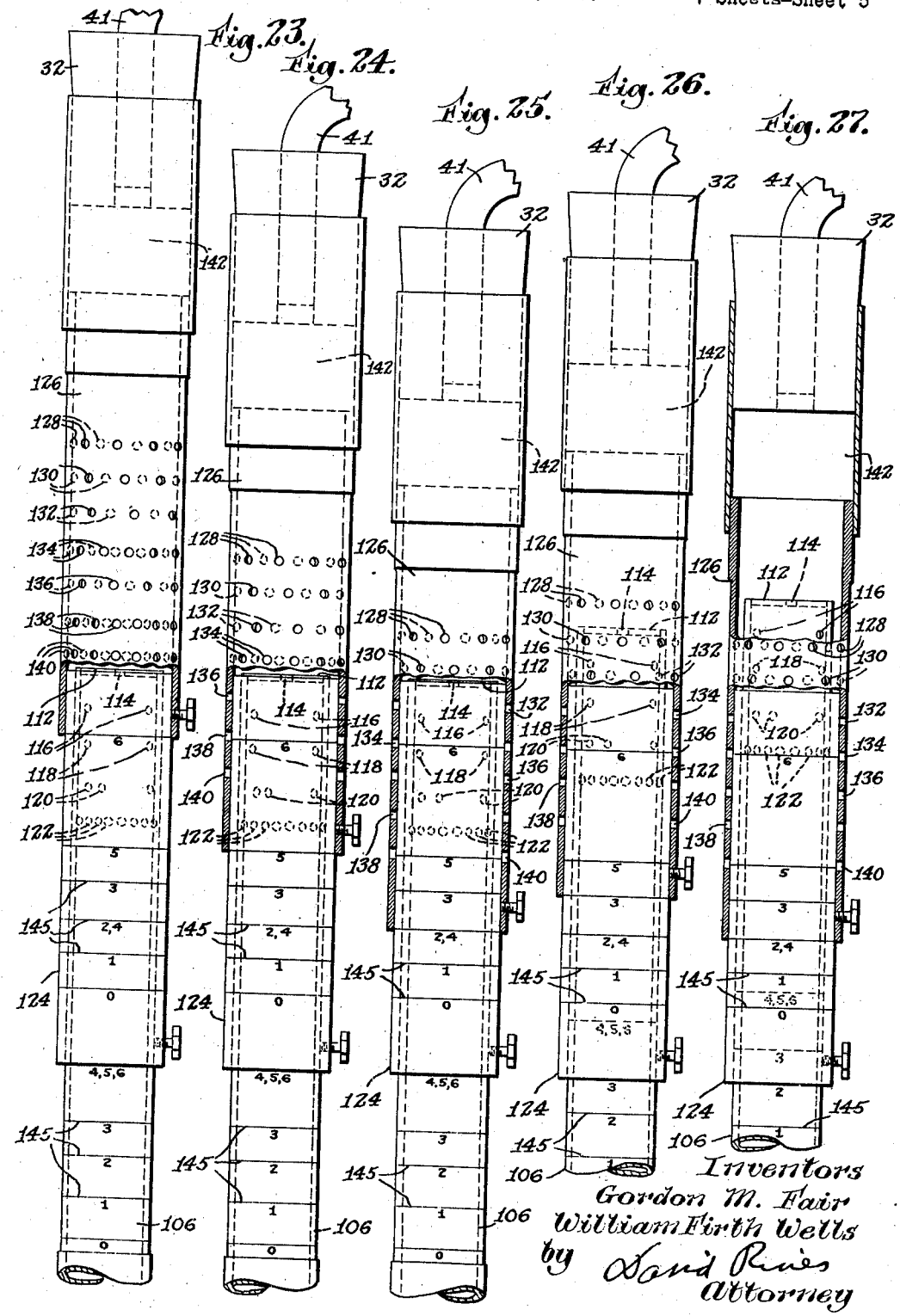

Nov. 15, 1938. G. M. FAIR ET AL 2,136,844
ODOR OBSERVER AND ODOR METER
Filed March 19, 1935 7 Sheets-Sheet 6
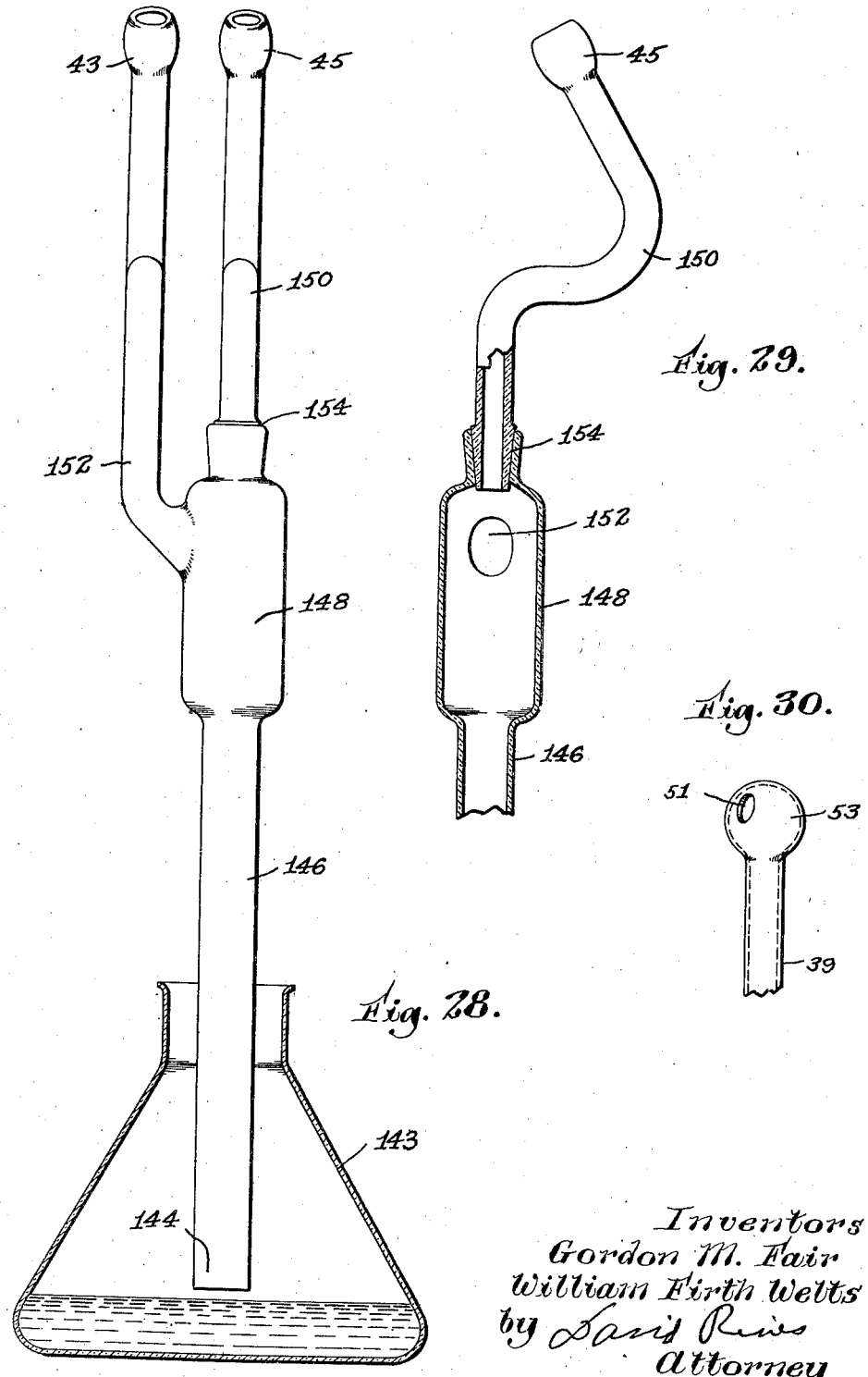
Inventors
Gordon M. Fair
William Firth Wells
by David Rines
Attorney

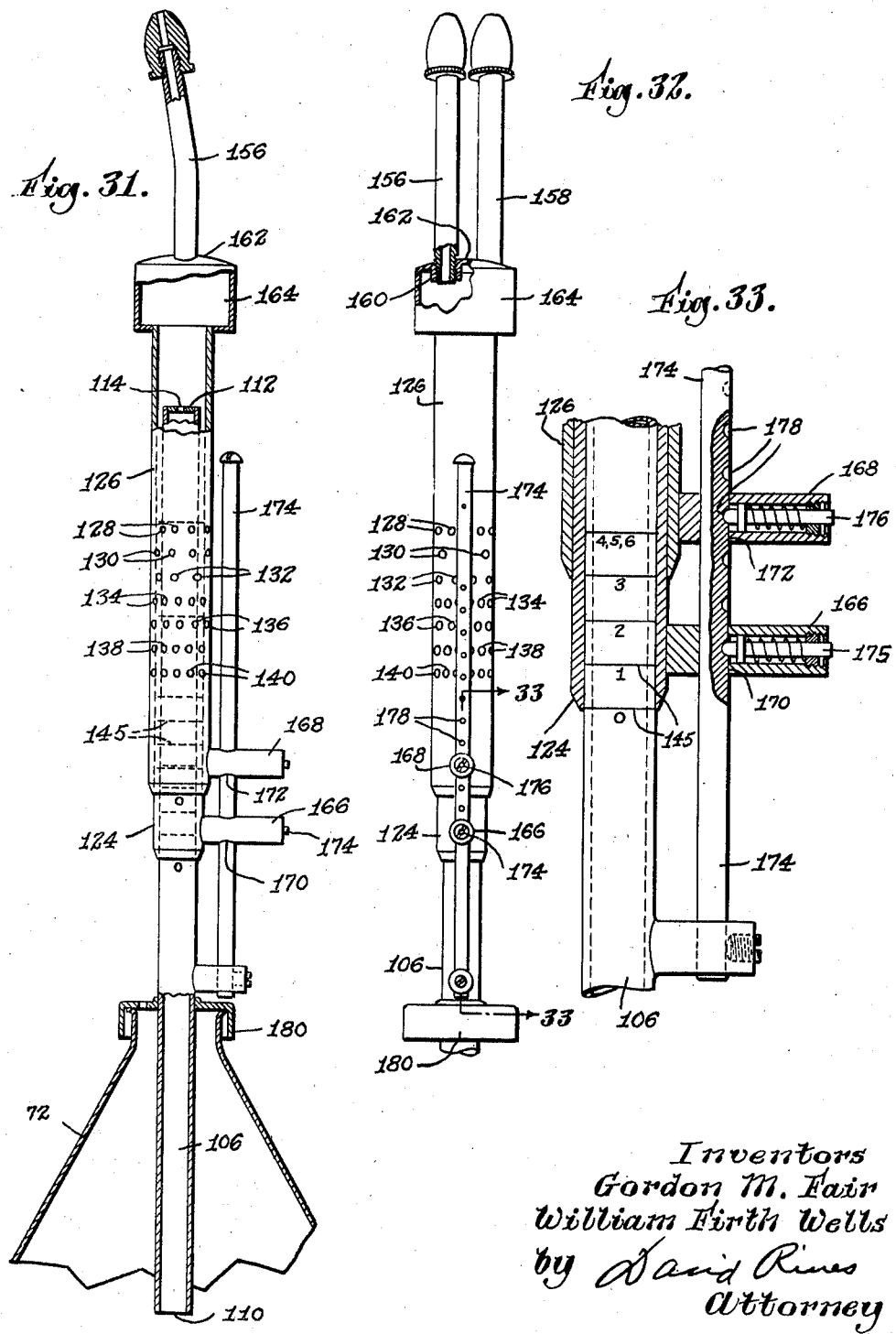

Patented Nov. 15, 1938

2,136,844

UNITED STATES PATENT OFFICE 2,136,844

ODOR OBSERVER AND ODOR METER

Gordon M. Fair and William Firth Wells, Cambridge, Mass.; said Wells assignor to said Fair Application March 19, 1935, Serial No. 11,894

33 Claims. (Cl. 73—51)

The present invention relates to apparatus for measuring or determining odors.

Unlike the senses of vision and hearing, for example—affected, as they are, by light and sound waves that are measurable or detachable by inanimate instruments—the sense of smell can not be measured or determined except by some living object. All proposals for determining or measuring smell must, therefore, depend directly upon physiological functions. It so happens that the organs of smell are exceedingly sensitive; they will respond to what are essentially chemical or physico-chemical changes so extremely minute as not to be detectable by chemical or physical analysis. Like all sense organs, however, they are subject to the Weber-Fechner psychophysical law, so that a change in odor concentration is not perceptible unless the change is great enough to constitute a definite functional increment—positive or negative, as the case may be—of the acting concentration or stimulus. It has long been recognized that it is physiologically impossible to measure smaller changes, because the smelling organs will not respond to such smaller changes. It is, therefore, futile to attempt any greater accuracy of measurement, and records appearing to show greater precision must necessarily be illusory or fictitious. Another factor that, though equally well understood, has not, apparently, been so fully and adequately considered in the design of smell-detecting and/or smell-measuring devices, is the factor of physiological fatigue. Unlike other sense organs, the organs of smell become very rapidly dulled, with the result that protracted smelling of an odor exhausts the power to recognize it. This is particularly true if the strength of the odor is great. If the odor is near the threshold, the fatigue will be small. Unless the organs of smell are utilized at the right moment, therefore, and for a moment only, and the odor is very dilute, the resulting measurement becomes impaired.

An object of the present invention, accordingly, is to provide new and improved apparatus for measuring or determining odors, using dilution processes, and activation by the nose.

Another object is to provide novel apparatus dependent, for its successful operation, upon intelligent use of the said Weber-Fechner law.

Another object is to provide an easily determinable scale of odor measurements.

Another object is to provide an instrument for determining the dilution required to bring a given odor to an approximate threshold value, as a means of measurement of the intensity of the odor.

Still another object is to provide novel apparatus adapted for prompt and momentary use, so as to prevent errors that might otherwise arise as a result of fatigue.

Another object is to test the odor by diluting it to the threshold value, or near it, before the odor is sensed, so as to reduce errors that might otherwise arise as a result of fatigue.

Another object is to provide means for compounding odors by testing the odor intensities of the substances that should be mixed to give the desired compound odor.

Another object is to provide means for neutralizing odors physiologically by testing the odor intensities of the substances that are to be mixed to neutralize each other physiologically.

Another object is to make it possible to use the nose to draw the raw or diluted odor into the nose without auxiliary flow-inducing apparatus and to have the nose induce the movement of both odor and diluting air towards the olfactory areas in the nose.

Still a further object is to design novel smell-detecting or smell-measuring apparatus particularly adapted to the anatomy of the nose and its relation to the olfactory cleft, near the highest point of the nasal cavity, so as to make it possible for the odors under test to reach the olfactory regions promptly and with certainty, instead of by-passing into the mouth through the passages connecting the mouth with the nose.

Other and further objects will be explained hereinafter, and will be particularly pointed out in the appended claims.

The invention will now be explained in connection with the accompanying drawings, in which Fig. 1 is a longitudinal section illustrating one embodiment of the invention comprising both an odor meter and an odor observer; Fig. 2 is a corresponding perspective, the telescopically adjustable tubes being shown detached; Figs. 3, 4, 5 and 6 are fragmentary perspectives showing the telescopically adjustable tubes in different positions of adjustment; Fig. 7 is a fragmentary perspective of a modification; Figs. 8, 9 and 10 are longitudinal sections, corresponding to Fig. 1, of further modifications; Fig. 11 is an elevation, partly in longitudinal section, of a further modification; Fig. 12 is a fragmentary elevation, partly broken away, looking in the direction of the arrow 12, Fig. 11; Fig. 13 is an elevation corresponding to Fig. 12 of a modification, a part being broken away, for clearness; Fig. 14 is an elevation of a further modification; Figs. 15, 16, 17 and 18 are views of the modification shown in Fig. 14, but with the parts in different positions, to illustrate the operation; Fig. 19 is an elevation, partly in longitudinal section, of another modification; Fig. 20 is a plan of the same; Figs. 21 to 27, inclusive, are fragmentary elevations of the same, partly in longitudinal section, but upon a larger scale than in Fig. 19, showing the parts in different positions of adjustment; Fig. 28 is a side elevation of still a further modification embodying an odor observer; Fig. 29 is a fragmentary end elevation of the same, partly in longitudinal section; Fig. 30 is an elevation of a modified detail; Fig. 31 is an elevation, partly in longitudinal section, of still a further modification; Fig. 32 is a front view of the same partly in section; and Fig. 33 is a section taken upon the line 33—33 of Fig. 32, looking in the direction of the arrows, but upon a larger scale.

The threshold value of an odor is defined as the smallest amount of the odorous substance required to stimulate the olfactory nerves and obtain a conception of, or sense, the odor. The measurements of arithmetically equal, successive units of sensation, that are just perceptible, will, according to the before-mentioned, psychophysical law of Weber and Fechner, require stimuli that vary in geometric ratio. A plot, using a geometric or logarithmic scale for odor concentration, and an arithmetic scale for intensity of sensation, therefore, will yield a straight line.

The next-higher, odor concentration, above the threshold concentration, that is just distinguishable, for example, is some multiple of the threshold concentration. This value may vary for different odors and different observers; but a readily recognized difference is obtained by doubling the odor concentration.

The next-higher concentration that is readily distinguishable, in the same way, is four times as great; the next-higher, eight times as great; and the successive, next-higher, concentrations, sixteen times, thirty-two times, etc., as great as the threshold concentration. There is thus developed a rational scale of odor, threshold intensities based upon the binary, geometric progression 1, 2, 4, 8, 16, 32, etc., the odor intensity being expressed in terms of the threshold value of the odor. The odor scale is, therefore, established as a power or exponential, scale, $$2^0, 2^1, 2^2, 2^3, 2^4, 2^5, \text{etc.}$$

By analogy with the practice of recording hydrogen-ion concentration, this exponential scale may be designated by the symbol pO; it being remembered, however, that pO is the logarithm to the base 2 (and not, as in the case of pH, to the base 10) of the odor, threshold intensity or concentration. The symbol pO 4, for example, may represent an odor threshold intensity of $2^4=16$. When expressed in grams of odorous substance per milliliter of air, this threshold value is called an "olfacty". The symbol pO4, for example, may, therefore, represent also an odor intensity of $2^4=16$ olfacties. Indirectly, therefore, the odor concentration may also be expressed in grams per milliliter, if the threshold intensity of the odor is known.

The modification illustrated in Figs. 14 to 18 will be described first, because it precedes the other modifications historically. A fuller description may be found in an article in the Journal of the New England Water Works Association, Vol. XLVII, September, 1933, commencing at page 248, entitled, "On the determination of odors and tastes in water".

Letting it be assumed that it is desired to measure the threshold value of an odor in a gas, it is proposed to dilute this odor with fresh, odor-free air, in geometric ratio, to its approximate threshold point.

A frame 2 may rest on an intermediately disposed bottom 4, in its normal position, or on either of two bottoms 6 and 8, that are inclinedly disposed at a 45-degree angle to the left and to the right, respectively, of the bottom 4. In the frame 2, there is suspended a burette comprising two hollow spheres 10 and 12, the lower portions of which are connected together by a pipe 14. A pipe 16 inclines upward and to the right, from the sphere 10, to a four-way stopcock 18. A pipe 20, leading from the sphere 12, similarly inclines upward, but to the left, to the stopcock 18. The stopcock 18 is connected with two further pipes 22 and 24. The pipe 22 is adapted to be connected, by tubing 26, with a receptacle 28 for an odor-containing gas. The pipe 24 is adapted to be connected with the lower end of an odor observer, comprising preferably a glass or metal tube 30, the upper end of which is provided with a stopper 32 in which is mounted a forked, glass or metal tube 34 having integral therewith two nose pieces 36 and 38, disposed side by side. The nose pieces 36 and 38 are adapted to be inserted into one's nostrils, to direct the odor in the tube 30 directly toward the olfactory cleft, in response to a light sniff. They fit into the nose in such a way that penetration of outside air is prevented.

If desired, the stopper 32 may contain two separate glass tubes 39 and 41, as illustrated in Figs. 7 and 19 to 21, each rotatably adjustable in the stopper, and each having an angularly disposed nose or nostril piece, shown at 43 and 45. Adjustment of these nose pieces 43 and 45 may thus be made for different nostril distances. The same result may be effected by means of metal nose pieces 156 and 158, as illustrated in Figs. 31 and 32, adjustable, for different nostril distances, by means of screw threads 160 in the upper wall 162 of a metal mixing chamber 164. A single nose piece 36 and 38 may, however, be employed.

It has heretofore been proposed to insert the observer's nose into a region containing the odors to be tested. Altogether aside from the fact that the olfactory organs become fatigued, during the long exposure of the nose in such region, there is a tendency for the currents of odor-containing gas under test, to which the nose is exposed, to travel into the nasal chamber and into the pharynx, without rising high enough to sweep past the olfactory surfaces, unless one sniffs. This is true whether the respiration is deep or shallow. A deep breath, in fact, may defeat its own object by preventing the relatively slow diffusion and gradual changes that are effective, during quiet breathing, to produce the desired sensation of smell, even with weak stimuli. If the face of the observer is exposed to odorous gas, one may also cover the face with the odorous gas and change response of the nose to the odor actually tested.

According to the present invention, this difficulty is overcome, and the detection of the odor made more precise and delicate, through the medium of the nose pieces 36 and 38, or 43 and 45, or 156 and 158, which reduce to a minimum the volume of the odor-containing gas in contact with the nose, and ensure that the odor-containing currents shall reach directly the olfactory areas, by being directed toward the olfactory cleft. It is thus possible to obtain the best results, with only a single, light sniff, and without errors introduced by fatigue.

The parts of the apparatus including the elements 24, 30, 32, 34, 36 and 38 may be termed an odor observer, because they serve merely to observe the odor. This odor observer is connected with an odor meter for measuring the odor intensity, as will presently be described. The combination of the odor observer and the odor meter may also be referred to as an odor meter. Most of the modifications illustrated and described herein, as, for example, Fig. 1, are odor meters. The modification illustrated in Fig. 28, however, is an odor observer, and not an odor meter.

In the normal position of the apparatus, in which the frame rests on its intermediately disposed bottom 4, as illustrated in Fig. 14, mercury or any other suitable fluid 40, contained in the spheres 10 and 12, occupies the position shown, half filling the spheres 10 and 12. Mercury is a satisfactory fluid for many odors which are not taken into solution to a measurable extent, or do not enter into combination with them. Its high density, furthermore, facilitates transfer of the odor from the receptacle 28 to the spheres 10 and 12, as will presently be explained. The modifications of the invention illustrated in Figs. 1 to 13 and 19 to 33, which render it unnecessary to employ mercury or another fluid, eliminate sources of error that may be introduced in cases where the odor-containing gas is attacked by the mercury or other fluid 40.

In line with what has been said above about the odor scale, the procedure that will ordinarily be found most useful calls for first filling the burette of the twin-sphere odor meter with the original odor from the receptacle 28 at a time when the instrument is changed from the position illustrated in Fig. 15 to the position illustrated in Fig. 16.

The frame 2 is first tilted, so as to rest on its inclined bottom 6, as shown in Fig. 15. The mercury 40 is thus caused to flow out of the sphere 12, so as to fill the sphere 10. The cock 18 is now turned, so as to connect the receptacle 28 with the sphere 10, after which the frame is tilted slowly to the position indicated in Fig. 16, so as to rest on the bottom 8. The mercury, thus flowing out of the sphere 10 and into the sphere 12, forces the odor to enter from the receptacle 28, into the sphere 10. This is permitted by an air vent 47 at the upper end of the receptacle 28. The stopcock 18 is now returned to its original position, followed by the return of the frame 2 to its normal position, in which it rests on its base 4, as illustrated in Fig. 17. The odor thus becomes equally distributed in the two spheres 10 and 12. The next operation is to turn the stopcock 18 again, so as to connect the sphere 12 with the odor-observer tube 30. By now slowly tilting the frame 2 to the position illustrated in Fig. 18, so as to rest on its bottom 8, the mercury will be caused to flow into the sphere 12. The odor in the sphere 12, which is half the total volume, is thus expelled into the odor-observer tube 30. The volume of displaceable odor may be about 220 c. c. If the odor-observer tube 30 holds about 60 c. c., all the air in the tube 30 will be driven or flushed out of the tube 30 and the tube will then become filled with the pure odor. The odor may be observed or detected by sniffing directly through the nose pieces 36 and 38 (or 43 and 45), as the odor is being displaced from the burette, or the odor-observer tube 30 may be detached and the odor sniffed.

At the same time that the odor is expelled from the sphere 12 into the tube 30, an equal amount of air is, of course, drawn into the sphere 10, so as correspondingly to add to the odor in the sphere 10 an equal amount of air. The odor in the sphere 10 thus becomes diluted in the ratio of one to two. The process is now repeated, to displace half the resulting, diluted volume into the odor-observer tube 30, followed by observation of the odor.

To this end, the next step is to return the stopcock 18 to its normal position and to return the frame 2 to the position, illustrated in Fig. 17, in which it rests on its bottom 4. The diluted odor thus becomes divided equally between the spheres 10 and 12. The displacement-and-dilution procedure is then repeated. This is continued until the threshold dilution is passed, and the odor is no longer perceivable, thus producing odor-free air; or the process may be stopped at any desired point, corresponding to the bland or mixture sought by the observer, as where it is desired to obtain a particular blend of perfume. Instead of diluting with odor-free air, it is possible to attach a pipe 22 to other odor containers similar to the receptacle 28 by tubing similar to 26, and draw in a gas or odor other than air for dilution or blending purposes.

The number of dilutions is the pO value. The threshold number is obtained by raising 2 to a power equal to the number of dilutions required to reach the threshold value for the given strength of the odor.

The stopper 32 is shown in Fig. 1 at the upper end of a metal or glass mixing tube 42, having openings in its sides at varying levels. Chromium-plated brass is a suitable metal, as it does not affect most of the odors to be tested. But other metals or metallic platings may be employed. Glass, or other inert substances, too, may be used. The uppermost opening is shown at 44. Two openings 46 and 48 are shown adjacent to the opening 44, and a little lower down. At a lower level still, there are four holes 50. Below the holes 50 are a number of series of eight holes each, the series being indicated at 52, 54, 56, 58, 60, 62 and 64, respectively.

A metal or glass tube 66, which may be termed an odor tube, fits snugly in the tube 42 and is telescopically adjustable therein so as to close successively, and in order, the openings 64, 62, 60, 58, 56, 54, 52, 50, 48 and 46, and 44, as the tube 66 is adjustably moved upward into the tube 42. The top end of the tube 66 is closed, as shown at 68, except that it is provided with an opening 70.

The openings 44, 46, 48, 50, 52, 54, 56, 58, 60, 64 and 70 are preferably all of the same shape and area, so as to provide hydraulically equal flows.

The space 49 in the tube 42, between the stopper 32 and the top 68 of the tube 66, constitutes an adjustable mixing chamber into which gases may be drawn through the said openings by sniffing through the nosepieces.

When the tube 66 occupies the position illustrated in Fig. 3, the odor-containing gas from a vessel 72 (Fig. 1) alone can be drawn into this adjustable chamber, through the opening 70. The odor thus drawn into the nostrils corresponds to a zero reading of the scale.

An odor can not be detected unless in gaseous form, as in the air—it can not be breathed while dissolved in a liquid.

If the vessel 72 contains water or other liquid, such as a liquid perfume, it may become charged with the odor-containing gas by, say, shaking up the liquid, or by using an atomizer 74 that discharges into the vessel 72, air being allowed to enter or leave the vessel 72 through an opening 76. If it is desired to measure the odor of a solid 77 (Fig. 8) in a tower provided in the receptacle 78, a closed, central screened chamber 80 may be provided into which the bottom of the tube 66 may be inserted. The odor from the solid 77 will travel into the chamber 80 and will be drawn up the tube 66, through the opening 70, into the said adjustable mixing chamber 49 in the tube 42, yet the screen will hold the solid away from the central chamber 80 of the receptacle 78, into which the tube 66 may be inserted.

When the tube 66 occupies the next lower position of adjustment (Figs. 1, 8 and 9), the adjustable, mixing chamber 49 in the tube 42 will contain the said odor-containing gas, drawn into the adjustable chamber through the opening 70, and also an equal amount of air blended therewith, the air being drawn into the adjustable chamber through the opening 44. The adjustable, mixing chamber 49 will, therefore, contain a one-to-two, diluted mixture of the odor-containing gas.

In the next-lower position of the tube 66, illustrated in Fig. 4, air will enter the chamber 49 through the three openings 44, 46 and 48, and the chamber will thus contain a one-to-four mixture of the odor-containing gas.

In the next-lower position of the tube 66, illustrated in Fig. 5, air will enter the chamber through the seven openings 44, 46, 48 and 50. The dilution of the odor-containing gas in the chamber will now, therefore, be one to eight.

In the next-lower position of the tube 66, illustrated in Fig. 6, air will enter through the eight additional openings 52, so that the dilution of the air-containing gas in the chamber will be one to sixteen.

The next-lower adjustment (not illustrated) of the tube 66 should be such as to admit air into the chamber through the sixteen additional holes 54 and 56, so as to provide a dilution of one part in thirty-two.

The next-lower adjustment (also not illustrated) of the tube 66 should carry the top 68 of the tube 70 below the thirty-two holes 58, 60, 62 and 64. The dilution will then be in the ratio of one to sixty-four.

After each said adjustment of the tube 66 with respect to the tube 42, each light sniff will draw odor through the opening 70 and air through the holes in the mixing tube 42, into the adjustable mixing chamber 49, the diluted mixture stream thus entering into the nostrils and being directed toward the olfactory areas. The process should be continued (additional holes being provided in the tube 42, if needed) until, or before, the threshold of sensitivity has been reached, as before described.

A meter is thus provided for gradually diluting the odor with a known or measured quantity of air in a definite ratio, to the end of determining how many dilutions of a given odor with an odor-free atmosphere are necessary in order to reach a determined, or a determinable, end point.

The reverse order of procedure is also possible and, in fact, recommended so that one may proceed from no sensible odor to the approximate threshold value. This is one advantage of the instruments in Figs. 1 to 13, 19 to 27, and 31 to 33 over those of Figs. 14 to 18.

In fact, when the adjustable nose pieces 43 and 45 are employed, the meter of the present invention may be so adjusted that, in the smelling or whiffing operation, the dilution of the gases is brought about very accurately, and without the necessity for employing any additional apparatus. The said end point or indicator may be determined as a sensory response,—as approximating the threshold or smallest distinguishable dilution, as before described.

Further to the attainment of this end, it is desirable to bend the tubes 39, 41, 156 and 158 somewhat as indicated in Figs. 7, 19, 21, 31 and 32, so that the nose pieces 43, 45, 156 and 158 shall be enabled to enter directly into the nostrils, side by side, when the observer occupies an upright, convenient, comfortable position and, furthermore, so as to provide an adjustment to the nostril distance and otherwise secure a comfortable fit of the nosepieces in the nose. Alternatively, without such bending, the nose piece should have an eccentrically positioned opening 51, and should be more spherically shaped, as shown at 53, Fig. 30. When the observer has to bend over into an uncomfortable, unerect, position, and when the fit of the nosepieces is poor, his observations are liable to be less precise.

The nozzles should be so formed as to fit into the nose in such a way that penetration of outside air is prevented, and yet without projecting an appreciable distance within the nostrils, as they might otherwise touch the sensitive lining of the nose. For example, the tops of the parts 36 and 38 should not be of such dimension as to permit touching more than the inner periphery of the nose. This may be brought about by having the nozzles somewhat spherical. At the same time, the nozzles should be so placed as to direct the odor towards the olfactory cleft.

It may be desirable to mix the odor from the vessel 72 with a second odor, instead of with air, in which event a container 82 may be built about the tube 42, as illustrated in Figs. 9 and 10, together with an inlet 84 for admitting the second test odor to the container 82. This chamber may also serve as a reservoir of odor-free air if the test is carried out in a room or other environment in which the air is not odor-free, or this chamber 82 may contain an odor-absorbing substance such as activated carbon to produce an odor-free air. Or the entrance 84 to the chamber 82 may be capped with a filter of odor-absorbing substance of low air resistance. If desired, indeed, still a third tube 86 may be used, for mixing or blending two odor-containing gases with clear or substantially odorless air, the third tube 86 being of substantially the same construction as the tube 42, and the three tubes 42, 66 and 86 being telescopically adjustable with respect to one another. If it is desired to mix with an inert or other suitable gas, instead of with air, or with a third odor, the third tube 86 may be contained in a second container 88, provided with an inlet 90, as illustrated in Fig. 10.

The principle of the invention may, of course, be employed with other apparatus also. Thus, the tube 92 of Figs. 11 to 13 may have two branches 94 and 96, the former having the single opening 79, and the other having a disk 98, pivotally adjustable at 100. The disk may have openings 102 of different size, as illustrated in Fig. 12, or a plurality of openings 104, Fig. 13, all of the same size, but grouped together to produce the same, geometric-ratio effect, as above described.

It is also possible to use a combination of numbers of equal openings or openings of different size to employ geometric ratios other than 1, 2, 4, 8, etc., such as 1, 1.5, 2.25, 3.375, etc., or 1, 3, 9, 27, etc.

It is also possible to replace each group of the multiple openings 46 and 48 and 50, 52, 54, 56, 58, 60, 62 and 64 of Figs. 1 to 6 and 8 to 10 by one or more hydraulically equivalent openings of different size and, if desired, of different shape. It is also possible to extend the range of the instrument by the addition of other pluralities of openings.

This may be understood from the following consideration. The same amount of gas can be caused to pass through two holes either with the aid of the same pressure drop through holes of the same area and shape, or with the aid of different pressure drops through holes of correspondingly different area and shape. Assuming the gas in one or more chambers to be at atmospheric pressure, for example, and to be drawn into a mixing chamber by suction of the nose, the pressure of the mixing chamber will become reduced by such suction. To vary the total amount of gas drawn into the mixing chamber under a given pressure gradient which may be constant or fluctuating in magnitude, either the number of holes of the same area and shape may be varied, or the area and the shape of the holes may be varied.

A more constant hydraulic or pressure gradient is maintained into the mixing chamber and more constant resistance to the nose, with the aid of the modification of Figs. 19 to 27 and 31 to 33. This instrument comprises an odor tube 106, which may or may not have an extension tube 108 attached at its lower, open end 110, and which, like the odor tube 66, is closed at the upper end 112, except for a small opening 114. This odor tube 106, also like the tube 66, is provided with a number of side openings, but differently arranged. There are two openings 116, at the same level, below the top 114; two openings 118 at a lower level, three openings 120 at a lower level still; and eight openings 122 at the lowest level.

In addition to the odor tube 106, the instrument of this modification comprises an unperforated tube 124, open at both ends, and in which the odor tube 106 is telescopically slidable so as to cover, in successive positions of adjustments, the openings 122, 120, 118 and 116. The tube 124 may be referred to as the central sleeve tube.

There is still a third tube 126, which may be referred to as the air tube, and in which the tube 124 is telescopically adjustable so as to cover, successively, seven levels of openings. The uppermost level contains eight openings 128; the next-lower level seven openings 130; the next-lower level six openings 132; the next-lower level ten openings 134; the next-lower level eight openings 136; and the last two lower levels, twelve openings 138 and 140, each.

The above are but examples of suitable numbers of holes in these various tubes.

By adjusting the odor tube 106 in the metal tube 124, to various positions, and covering the metal tube 124 with the air tube 126 in various positions of adjustment, it is possible to obtain mixtures of odor and air in the desired ratios of 1 to 2, 1 to 4, etc., while maintaining substantially the same total number of holes through which the air and the odor enter a mixing chamber 142, at the upper end of the air tube 126.

In order to draw into the nose piece the undiluted odor, corresponding to pO=0, the instrument may be so set that the central sleeve tube 124 shall leave all the openings 114 to 122 in the odor tube 106 free, closing all the openings 128 to 140 in the air tube 126, as illustrated in Figs. 19 and 21. The odor will therefore be drawn through all the sixteen holes 114 to 122, and without any air mixed therewith.

In order to obtain a dilution of 1 to 2, where pO=1, the setting of the central sleeve 124 would be such as to cover the eight holes 122 of the odor tube 106 and leave the eight holes 128 of the air tube 126 free, as illustrated in Fig. 22. The odor and air will then be drawn into the chamber 142 in equal proportions; and again through a total of sixteen holes.

In Fig. 27, the adjustment is such that the odor is drawn through the five holes 114 to 118 and the air through the fifteen holes 128 and 130. The dilution is now in the ratio of 1 to 4, or pO=2. The total number of holes through which the air and the odor enters is twenty, not far from sixteen.

When the parts are adjusted as illustrated in Fig. 26, the odor enters through the three holes 114 to 116 and the air through the twenty-one holes, 128, 130 and 132, a total of twenty-four holes, which is also not far removed from sixteen. The odor radio is 1 to 8; pO=3.

To obtain a ratio of odor to air of 1 to 16, or pO=4, one needs but to adjust the parts as illustrated in Fig. 25, where only the one hole 114 admits odor to the mixing chamber 142, while the air enters through the fifteen holes 128 and 130, as in Fig. 27. The total of sixteen holes has here been restored.

Two more ratios are possible with the instrument illustrated in Figs. 19 to 27 and 31 to 33: 1 to 32 and 1 to 64, the former giving a pO value of 5, and the latter of 6. In both cases, the odor will enter the mixing chamber 142 through the single hole 114; the air, however, will enter the chamber 142 through the thirty one holes 128 to 134, and through the sixty-three holes 128 to 140, respectively. The total number of holes is here 32 and 64, respectively.

In this design, therefore, the number of holes through which the odor and air mixture is drawn is substantially the same, although it does vary from a low value of sixteen to a high value of sixty-four, the actual numbers being 16, 16, 20, 24, 16, 32 and 64, respectively. The resistance against which the nose works, using the instrument of Figs. 19 to 27 and 31 to 33, therefore, is more nearly uniform, thereby disturbing less the uniform conditions and also the pressure gradient or difference under which the air and the odor-containing gas are drawn through the holes, than is the case with the devices illustrated in Figs. 1 to 11, where there is not the same uniform resistance, nor the same hydraulic or pressure gradient from the nose to the holes for the different settings. Other suitable numbers of holes can be employed to keep the total number of holes substantially constant, also for the higher dilutions. Thus, in Figs. 31 and 32, the openings 136 and 138 are each ten in number, their total being twenty, as in Figs. 19 to 27. The total number of openings can also be kept exactly constant; for example, as illustrated and described in application, Serial No. 54,431, filed December 14, 1935.

A series of indices 145 may be provided on the tubes to indicate the various settings; and in order to assist in setting the instrument in the various positions in which definite dilutions are accomplished, there may be provided, as illustrated in Figs. 31 to 33, a mechanism consisting of two holders 166 and 168, integral with the respective tubes 124 and 126. These holders have openings 170 and 172 through which extend a guide rod 174, fixed to the tube 166. The holders each have a spring-pressed plunger 175 and 176, respectively, which fit into depressions 178 provided at suitable intervals along the guide rod 174. In this modification, which is entirely of metal, a disk 180 is provided for setting the instrument on top of the flask 72.

The invention has many applications. It may, for example, be used to measure the odor in a room or chamber, the tube 66 or 106 being inserted through a wall or door of the room, and the mixing tube 42 or 126 being free to the atmosphere, or inserted in a special chamber. The invention has uses also in addition to odor measurement and determination. It is of value, for example, in diagnosis, for testing sensitivity of a person's olfactory areas against an odor of known value, for a subnormal or hyper-normal odor-detecting sensitivity may readily be made apparent in accordance with the present invention. It is of use also in anaesthesia; by sliding the tubes relatively to each other, after an initial adjustment, it is possible, assuming that the ether is under atmospheric pressure, to control precisely the mixture of ether and air so as to regulate the mixture and obtain any desired proportion of these constituents.

In Figs. 28 and 29, there is illustrated a non-adjustable instrument that may, if desired, be made wholly of glass. This instrument is not intended for the direct purpose of measuring threshold odor intensities, or different odor concentrations; but for the purpose of observing or testing the odor conveniently and accurately by directing the odor towards the olfactory areas and without the admittance of air that would enter the nostrils without its use. To this purpose, this instrument may replace the odor- observer tube 30 used in connection with the odor meter illustrated in Figs. 14 to 18.

It is common practice to dilute an odor-containing liquid in a bottle or jar 143 for mixing it with a desired quantity of odorless water. The vessel 143 is closed by means of a stopper and the mixed contents shaken, after which the stopper is removed, and the observer whiffs the resulting odor. The instrument illustrated in Figs. 28 and 29 provides a more precise observation or testing of the raw or mixed odor.

The bottom, open end 144 is inserted into the bottle 143 to a distance very close to the surface of the liquid to permit the odor to travel up the tube 146 into an enlarged chamber 148 to which are connected an adjustable nozzle tube 150 and a stationary nozzle tube 152. Both nostrils will thus receive the odor-containing gas in the jar or bottle 143 and the measurement will be made under the same conditions as with the other instruments before described.

The parts, if of glass, should preferably be connected by ground joints, such as shown at 154. Cork stoppers may absorb odors, though they may be covered with paraffin to eliminate the odors. Metal joints may also be used, as illustrated in Figs. 31 and 32. The stopper shown in Fig. 1, too, may be made of glass, with ground-glass joints, or a metal joint may be employed.

Other modifications will also occur to persons skilled in the art. It is therefore desired that the appended claims be broadly construed, except where limitations may be required in view of the state of the art.

What is claimed is:

1. An odor meter comprising a screened chamber into which odor from a solid may enter, a second chamber provided with means for admitting the odor into the chamber, and means for diluting the odor in substantially geometric ratio.

2. An odor meter comprising a chamber provided with openings through which a volume of an odor-containing gas may be admitted into the chamber and with a plurality of equivalent openings through which another gas may be admitted into the chamber in volumes that are related to the first-named volume in substantially geometric ratio.

3. An odor meter comprising a chamber provided with adjustable openings through which a volume of an odor-containing gas may be admitted into the chamber and with adjustable openings through which another gas may be admitted into the chamber in volumes that are related to the first volume in substantially geometric ratio.

4. An odor meter comprising a chamber provided with an opening through which a volume of an odor-containing gas may be admitted into the chamber and with a plurality of openings through which another gas may be admitted into the chamber in volumes that are related to the first-named volume in substantially geometric ratio, a container communicating with the plurality of openings, and means for admitting said other gas to the container.

5. An odor meter comprising two tubes, one of the tubes having a top and being telescopically adjustable in the other tube to form an adjustable chamber in said other tube, said top being provided with an opening through which a volume of an odor-containing gas may be admitted into the chamber, said other tube having a plurality of openings through which another gas may be admitted into the chamber, the walls of the first-named tube being adapted to open and close selected openings in said other tube, depending upon the degree of telescopic adjustment of the tubes, and the said plurality of openings having a relation to the first-named opening such that the volumes of said other gas admitted into the chamber through the said plurality of openings when the tubes occupy predetermined positions of relative telescopic adjustment is in substantially geometric ratio to the volume of the odor-containing gas admitted into the chamber through the first-named opening.

6. An odor meter comprising two tubes, one of the tubes having a top and being telescopically adjustable in the other tube to form an adjustable chamber in said other tube, said top being provided with an opening through which a volume of an odor-containing gas may be admitted into the chamber, said other tube having a plurality of openings through which another gas may be admitted into the chamber, the walls of the first-named tube being adapted to open and close selected openings in said other tube, depending upon the degree of telescopic adjustment of the tubes, and means for indicating the position of telescopic adjustment.

7. An odor meter comprising two tubes, one of the tubes having a top and being telescopically adjustable in the other tube to form an adjustable chamber in said other tube, said top being provided with an opening through which a volume of an odor-containing gas may be admitted into the chamber, said other tube having a plurality of openings through which another gas may be admitted into the chamber, the walls of the first-named tube being adapted to open and close selected openings in said other tube, depending upon the degree of telescopic adjustment of the tubes, and means for maintaining the tubes in adjusted position.

8. An odor meter comprising a tube having a plurality of openings at predetermined positions in its side, the odor meter comprising also a second tube telescopically adjustable in the first-named tube in a direction toward the first-named openings so as to close the said plurality of openings in successive positions of telescopic adjustment of the tubes, said second tube having a top provided with an opening, the openings being all of the same area.

9. An odor meter comprising a chamber having two branches, one of the branches being provided with means for admitting a volume of an odor-containing gas into the chamber, and the other branch having means for admitting another gas into the chamber, the said means being adapted to occupy a plurality of successive positions in which the gases are admitted into the chamber in volumes that are related to the first-named volume in geometric ratio, the said successive positions being calibrated to indicate the said substantially geometric ratio.

10. An odor meter comprising a base having two rigid tubes mounted on the base having nose pieces angularly disposed to each other, the nose pieces being adapted to be inserted into the nostrils of a nose and having means for directing an odor toward the olfactory cleft, the tubes being adjustable on the base to vary the distance between them.

11. Apparatus for measuring the odor of a gas comprising a reservoir for the odor-containing gas, a chamber connected with the reservoir, whereby the odor-containing gas may be drawn into the chamber from the reservoir, a reservoir for a diluting gas connected with the chamber, whereby the diluting gas may be drawn into the chamber from the second-named reservoir, and means for maintaining the two reservoirs under substantially the same pressures, thereby making the ratios of dilution determinable.

12. An odor meter comprising a chamber provided with means for admitting an odor-containing gas into the chamber, and means for diluting the gas adapted to occupy a plurality of successive positions in which the gas is diluted in substantially geometric ratio, the said successive positions being calibrated to indicate the said substantially geometric ratio.

13. An odor meter comprising a chamber provided with means for admitting a volume of an odor-containing gas into the chamber, and means for admitting another gas into the chamber, the last-named means being adapted to occupy a plurality of successive positions in which the gases are admitted into the chamber in volumes that are related to the first-named volume in geometric ratio, the said successive positions being calibrated to indicate the said substantially geometric ratio.

14. An odor meter comprising a chamber, means for simultaneously supplying different gases to the chamber, a rigid tube connected with the chamber and provided with a nose piece at its free end, the nose piece being disposed at an angle to the tube to adapt it for entering into the nose in such position as to direct the gases from the chamber directly to the olfactory cleft.

15. An odor meter comprising a chamber provided with means for admitting two odor-containing gases thereto, and means for controlling the admission of the gases to the chamber, the last-named means being adapted to occupy a plurality of successive positions in which the gases are admitted to the chamber in substantially geometric ratio, the said successive positions being calibrated to indicate the said substantially geometric ratio.

16. An odor meter comprising a chamber provided with a plurality of openings through which an odor-containing gas and another gas may be respectively admitted into the chamber, the number of openings being variable in order that the gases may be admitted into the chamber in substantially geometric ratio.

17. An odor observer comprising a chamber, two nozzles, and rigid tubes connecting the nozzles with the chamber, the tubes being bent toward each other from an intermediate point of each tube toward the nozzle.

18. An odor meter comprising a base having two rigid tubes mounted thereon in side-by-side relation and each provided with a nose piece, the nose pieces being adapted to be inserted into the nostrils of a nose, the nose pieces having means for directing an odor toward the olfactory cleft, and the stems being adjustable on the base to vary the distance and the angular relation between the nose pieces.

19. An odor meter comprising an odor tube, a central sleeve in which the odor tube is telescopically adjustable and an air tube in which the central sleeve is telescopically adjustable, the air tube having a chamber into which an odor-containing gas may be admitted from the odor tube.

20. An odor observer comprising a tube into which odor-containing gases are adapted to enter through one end of the tube, a base at the other end of the tube, two rigid tubes extending through the base into the first-named tube, the ends of the said two tubes extending beyond the first-named tube being provided with nose pieces, the nose pieces being angularly adjustable with respect to each other.

21. An odor observer comprising a tube into which odor-containing gases are adapted to enter through one end of the tube, a base at the other end of the tube, two rigid tubes mounted on the base and communicating with the first-named tube, the free ends of the said two tubes being provided with nose pieces, the said two tubes being twistable on the base so as to direct the odor through the nose pieces towards the olfactory cleft.

22. An odor observer comprising a tube provided with a substantially spherical nozzle, the nozzle having an opening communicating with the tube and that is eccentrically positioned with respect to the axis of the tube.

23. An odor meter comprising a chamber into which odor from a solid may enter, a second chamber provided with means for admitting the odor from the first-named chamber into the second chamber, and means for diluting the odor in the second-named chamber in substantially geometric ratio.

24. An odor meter comprising a chamber provided with an opening through which a volume of an odor-containing gas may be admitted into the chamber and with a plurality of openable and closable openings through which another gas may be admitted into the chamber in volumes that are related to the first-named volume in substantially geometric ratio.

25. An odor meter comprising two tubes, one of the tubes being telescopically adjustable in the other tube to form an adjustable chamber between the tubes, the tubes having a plurality of openings through which two gases may be respectively admitted into the chamber, a plurality of the openings being adapted to open and close in selected positions of telescopic adjustment of the tube.

26. Apparatus for measuring the odor of a gas comprising a reservoir for the odor-containing gas, a chamber connected with the reservoir, whereby the odor-containing gas may be drawn into the chamber from the reservoir, and means whereby a diluting gas may be drawn into the chamber from the source of supply of the diluting gas, the reservoir and the source of supply being under substantially the same pressures, thereby making the ratios of dilution determinable.

27. An odor meter comprising a base having two rigid bent tubes mounted thereon in side-by-side relation and each provided with a nose piece, the nose pieces being adapted to be inserted into the nostrils of a nose, the tubes being bent at such an angle that the disposition of the assembled nose piece and tubes is such as to facilitate directing an odor toward the olfactory cleft when the nose pieces are inserted into the nostrils in a comfortable position, and the stems being adjustable on the base to vary the distance and the angular relation between the nose pieces.

28. An odor meter comprising a chamber provided with openings through which different gases may be drawn by the nose into the chamber from different sources of supply of the different gases, the openings being adjustable to vary the proportions of the different gases drawn into the chamber, and means for maintaining a substantially equal pressure gradient of the different gases into the chamber.

29. An odor meter comprising a chamber into which gases may be drawn by the nose in varying proportions from different gas sources, means for maintaining a substantially equal pressure gradient into the chamber from the gas sources, and means for varying the areas through which the respective gases pass while maintaining substantially equal pressure gradients, thereby determining the ratio of the volumes or flows of the different gases admitted to the chamber.

30. An odor meter comprising two substantially concentric tubes, a third tube telescopically adjustable in one of the two tubes to form an adjustable chamber between the tubes, said two tubes each having a series of openings through which two gases may be respectively admitted into the chamber, the openings being adapted to open and close in selected positions of adjustment of the third tube, and the arrangement of the openings being such that the number of openings through which the gases are admitted into the chamber is substantially constant in all positions of telescopic adjustment of the third tube.

31. An odor observer comprising a substantially straight rigid tube having a nozzle at the substantially straight end of the substantially straight tube, the axis of the nozzle substantially coinciding with the axis of the tube, the nozzle being provided with an opening communicating with the tube and the plane of which is disposed eccentrically to the straight direction of extension of the tube.

32. An odor meter comprising a chamber provided with means for admitting two gases thereto, and means for controlling the admission of the gases to the chamber in substantially geometric ratio irrespective of variations in the rate of flow.

33. An odor meter comprising a chamber provided with openings through which different gases may be drawn by the nose into the chamber from different sources of supply of the different gases, the openings being adjustable so as to vary the proportions of the different gases drawn into the chamber that they shall be drawn into the chamber in volumes that are related to each other in substantially geometric ratio.

GORDON M. FAIR.
W. F. WELLS.